(12) United States Patent
Du et al.

(10) Patent No.: US 9,047,449 B2
(45) Date of Patent: Jun. 2, 2015

(54) METHOD AND SYSTEM FOR ENTITY AUTHENTICATION IN RESOURCE-LIMITED NETWORK

(75) Inventors: Zhiqiang Du, Xi'an (CN); Manxia Tie, Xi'an (CN); Yanan Hu, Xi'an (CN); Zhenhai Huang, Xi'an (CN)

(73) Assignee: CHINA IWNCOMM CO., LTD., Xi'an, Shaanxi (CN)

( * ) Notice: Subject to any disclaimer, the term of this patent is extended or adjusted under 35 U.S.C. 154(b) by 39 days.

(21) Appl. No.: 13/819,698

(22) PCT Filed: Dec. 21, 2010

(86) PCT No.: PCT/CN2010/080046
§ 371 (c)(1),
(2), (4) Date: May 10, 2013

(87) PCT Pub. No.: WO2012/024876
PCT Pub. Date: Mar. 1, 2012

(65) Prior Publication Data
US 2013/0326584 A1  Dec. 5, 2013

(30) Foreign Application Priority Data

Aug. 27, 2010  (CN) .......................... 2010 1 0265319
Nov. 23, 2010  (CN) .......................... 2010 1 0556498

(51) Int. Cl.
*G06F 15/16* (2006.01)
*G06F 7/04* (2006.01)
(Continued)

(52) U.S. Cl.
CPC .............. *G06F 21/30* (2013.01); *H04L 9/3273* (2013.01); *H04L 63/08* (2013.01); *H04L 63/0884* (2013.01); *H04L 2209/805* (2013.01)

(58) Field of Classification Search
CPC ........................................................ G06F 12/14
USPC ........... 370/338; 380/270, 277; 713/169, 194; 726/3, 31, 2, 5
See application file for complete search history.

(56) References Cited

U.S. PATENT DOCUMENTS 8,074,083 B1 * 12/2011 Lee et al. ....................... 713/194
2005/0050328 A1 *  3/2005 Mizrah ......................... 713/171
(Continued)

FOREIGN PATENT DOCUMENTS

CN  101052033  10/2007
CN  101132280   2/2008
(Continued)

OTHER PUBLICATIONS

China Patent Office, "First Office Action", issued in connection with CN application No. 201010556498.1, mailed Jul. 4, 2011, (5 pages).
Patent Cooperation Treaty, "International Search Report and Written Opinion", issued in connection with PCT application No. PCT/CN2010/080046, mailed May 26, 2011, (13 pages).
(Continued)

*Primary Examiner* — Thanhnga B Truong
*Assistant Examiner* — Khalil Naghdali
(74) *Attorney, Agent, or Firm* — Hanley, Flight & Zimmerman, LLC (57) ABSTRACT

A method and a system for entity authentication in a resource-limited network are provided by the present invention. Said method comprises the following steps: 1) entity A sends an authentication request message to entity B; 2) after receiving the authentication request message, entity B sends an authentication response message to entity A; and 3) entity A determines the validity of entity B according to the received authentication response message. The authentication between entities in a resource-limited network can be implemented by the application of the present invention.

16 Claims, 3 Drawing Sheets

(51) Int. Cl.
　　*G11C 7/00*　　　(2006.01)
　　*H04L 9/32*　　　(2006.01)
　　*G06F 21/30*　　(2013.01)
　　*H04L 29/06*　　(2006.01)

(56) References Cited

U.S. PATENT DOCUMENTS

2006/0143453 A1* 6/2006 Imamoto et al. ............. 713/169
2007/0250919 A1 10/2007 Shull et al.
2009/0094372 A1* 4/2009 Nyang et al. ................. 709/229
2011/0138192 A1* 6/2011 Kocher et al. ................ 713/189
2011/0164749 A1* 7/2011 Natarajan ..................... 380/270

FOREIGN PATENT DOCUMENTS

| CN | 101159549 | 4/2008 |
| CN | 101159639 | 4/2008 |
| CN | 101222328 | 7/2008 |
| CN | 101364875 | 2/2009 |
| CN | 102035645 | 2/2012 |
| EP | 2101302 | 9/2009 |

OTHER PUBLICATIONS

International Searching Authority, "International Search Report", issued in connection with PCT/CN2010/080046, dated May 26, 2011 (7 pages).

* cited by examiner

METHOD AND SYSTEM FOR ENTITY AUTHENTICATION IN RESOURCE-LIMITED NETWORK

FIELD OF TECHNOLOGY

This invention relates to the field of network security application in the information security technology, and particularly, to a method and a system for entity authentication in a resource-limited network.

BACKGROUND

The resource-limited wireless network including sensor network, magnetic field area network, Radio Frequency Identification (RFID) network, etc. has a broad application prospect in the fields such as military, environment monitoring, forest fire prevention, health care, logistics and the like, and plays an increasingly important role in those fields. But due to the wireless and broadcast characteristics in the communication, such network may be susceptible to attacks such as the messages being intercepted, tampered and forged and the entities being captured and copied. Thus it is necessary to introduce a low-overhead authentication and message secrecy mechanism, so as to ensure the validity of entities, and the confidentiality and integrity of communication messages in such network.

The current authentication methods are usually based on the crypto-operation, and require the entities in the network to preset corresponding cryptographic algorithms, otherwise the authentication protocol cannot be executed. In addition, even if the entities preset the cryptographic algorithms, the execution of the authentication protocol will also cause a calculation overhead to the entities in the network. For example, the authentication methods based on the symmetrical and unsymmetrical cryptographic algorithms both require the entities to perform an encryption and decryption operation, which increases the resource burden of the network entities, thus those methods are not suitable to be employed by the resource-limited network.

SUMMARY

In order to solve the above problem existed in the prior art, the present invention provides a method and a system for entity authentication in a resource-limited network, so as to solve the problem in the prior art that the network entities have too heavy resource burdens.

The technical solution of the present invention is a method for entity authentication in a resource-limited network, comprising:

sending, by an entity A, an authentication request message to an entity B;

sending, by the entity B, an authentication response message to the entity A after receiving the authentication request message sent by the entity A; and determining, by the entity A, the validity of the entity B according to the received authentication response message. Till now, the entity A performs a unilateral authentication on the entity B.

Alternatively, after determining, by the entity A, the validity of the entity B according to the received authentication response message, the method further comprising:

sending, by the entity A, an authentication result message to the entity B, wherein if the entity A determines that the entity B is valid, the authentication result message contains authentication success information; if the entity A determines that the entity B is invalid, the authentication result message contains authentication failure information. In that case, a message timeout processing time limit T4 may be set, and if the entity B does not receive the correct authentication result message within time T4 after sending the authentication response message, the entity B resends the authentication response message to the entity A, and if the correct authentication result message is not received when the authentication response message is resent q times and the time by which the authentication result message is waited to be received is T4 each time, the entity B determines that the authentication fails, wherein q is a preset number of times of resending the authentication response message.

Alternatively, determining, by the entity A, the validity of the entity B according to the received authentication response message specifically comprising: if the entity A determines that the entity B is valid, it means that the entity A performs a successful authentication on the entity B; if the entity A determines whether the entity B is invalid, the entity A discards the authentication response message.

In order to implement a mutual authentication between the entity A and the entity B, the method further comprising:

if the entity A performs a successful authentication on the entity B, constructing, by the entity A, an authentication response acknowledge message and sends the authentication response acknowledge message to the entity B, so as to start the mutual authentication with the entity B.

The entity B determines the validity of the entity A after the entity B receives the authentication response acknowledge message.

After the entity B determines the validity of the entity A after the entity B receives the authentication response acknowledge message, the method further comprising: sending, by the entity B, an authentication result message to the entity A, wherein if the entity B determines that the entity A is valid, the authentication result message contains authentication success information, if the entity B determines that the entity A is invalid, the authentication result message contains authentication failure information. In that case, a message timeout processing time limit T3 may be set: if the entity A does not receive the correct authentication result message within time T3 after sending the authentication response acknowledge message, the entity A resends the authentication response acknowledge message to the entity B, and if the entity A does not receives the correct authentication result message when the authentication response acknowledge message is resent n times and the time by which the authentication result message is waited to be received is T3 each time, the entity A determines that the authentication fails, wherein n is a preset number of times of resending the authentication response acknowledge message.

Alternatively, before sending, by the entity A, the authentication request message to the entity B, the method further comprising:

0) sharing a Pre-Shared key (PSK) between the entity A and the entity B.

Alternatively, the entity A sends the authentication request message to the entity B specifically comprising:

sending, by the entity A, the authentication request message to the entity B, wherein the authentication request message comprises SN1 obtained in such a manner that the entity A generates a random number N1 and calculates $SN1 = N1 \oplus PSK$, wherein the symbol '$\oplus$' represents a bitwise exclusive or operation.

Alternatively, above sending, by the entity B, the authentication response message to the entity A specifically comprises:

after receiving the authentication request message sent by the entity A, firstly, the entity B calculates N1=SN⊕PSK, obtains RN1 by reversing the bit sequence of N1 tailfirst, and calculates SRN1=RN1⊕PSK;

the entity B generates a random number N2 to calculate SN2=N2⊕PSK, the entity B constructs the authentication response message and sends the authentication response message to the entity A, wherein the authentication response message comprises SRN1 and SN2.

Wherein the entity B does not need to generate N2 and calculate SN2 when the entity A performs unilateral authentication on the entity B, and the authentication response message sent from the entity B to the entity A only contains SRN1.

Alternatively, above determining, by the entity A, the validity of the entity B according to the received authentication response message specifically comprises:

after receiving, by the entity A, the authentication response message sent by the entity B, firstly, calculating, by the entity A, RN1=SRN1⊕PSK, obtaining N1' by reversing the bit sequence of RN1 tailfirst, and determining whether N1' is equal to N1 generated by the entity A in step S1, wherein if N1' is not equal to N1, the entity A discards the authentication response message; if N1' is equal to N1, the entity A determines that the entity B is valid, which means that the entity A performs a successful authentication on the entity B.

Alternatively, above constructing, by the entity A, the authentication response acknowledge message and sends the authentication response acknowledge message to the entity B specifically comprising:

after the entity A performs a successful authentication on the entity B, calculating, by the entity A, N2=SN2⊕PSK, obtaining RN2 by reversing the bit sequence of N2 tailfirst, calculating SRN2=RN2⊕PSK, constructing the authentication response acknowledge message and sending the authentication response acknowledge message to the entity B, wherein the authentication response acknowledge message 30 comprises SRN2; calculating, by the entity A, a session key SK=N1⊕N2⊕PSK between the entity A and the entity B. Wherein the operation of calculating the session key SK is optional, and the entity A calculates the session key SK only when the session message between the entity A and the entity B need to be protected.

Alternatively, above determining, by the entity B, the validity of the entity A specifically comprises:

calculating, by the entity B, RN2=SRN2⊕PSK, obtaining N2' by reversing the bit sequence of RN2 tailfirst, and determining whether N2' is equal to N2 generated in step S2, and if N2' is equal to N2, the entity B determines that the entity A is valid; if N2' is not equal to N2, the entity B discards the authentication response acknowledge message.

After determining, by the entity B, that the entity A is valid, the entity B may calculate a session key SK=N1⊕N2⊕PSK according to the fact whether the session message with the entity A needs to be protected.

In addition, alternatively, the entity A may set its message timeout processing time limit T1: if the entity A does not receive the correct authentication response message within time T1 after sending the authentication request message, resending, by the entity A, the authentication request message to the entity B; further, if the correct authentication response message is not received when the authentication request message is resent m times and the time by which the authentication response message is waited to be received is T1 each time, the entity A determines that the authentication fails, wherein m is a preset number of times of resending the authentication request message.

In addition, the entity B may set its message timeout processing time limit T2: if the entity B does not receive the correct authentication response acknowledge message within time T2 after sending the authentication response message, resending, by the entity B, the authentication response message to the entity A; further, if the correct authentication response acknowledge message is not received when the authentication response message is resent p times and the time by which the authentication response acknowledge message is waited to be received is T2 each time, the entity B determines that the authentication fails, wherein p is a preset number of times of resending the authentication response message 20.

A system for entity authentication in a resource-limited network is characterized in comprising an entity A and an entity B between which a PSK is shared; wherein the entity A sends an authentication request message to the entity B, and receives an authentication response message from the entity B; wherein the entity B receives the authentication request message from the entity A and sends the authentication response message to the entity A.

An authenticating entity in a resource-limited network, which has shared a PSK with an authenticated entity; wherein the authenticating entity comprises:

a first sending module configured to send an authentication request message to the authenticated entity;

a first receiving module configured to receive an authentication response message returned by the authenticated entity having received the authentication request message; and a first authenticating module configured to determines the validity of the authenticated entity according to the received authentication response message.

Alternatively, the authenticating entity further comprises:

a second sending module configured to send an authentication response acknowledge message to the authenticated entity, so that the authenticated entity determines the validity of the authenticating entity after receiving the authentication response acknowledge message.

An authenticated entity in a resource-limited network, which has shared a PSK with an authenticating entity; wherein the authenticated entity comprises:

a second receiving module configured to receive an authentication request message sent by the authenticating entity; and a third sending module configured to send an authentication response message to the authenticating entity, so that the authenticating entity determines the validity of the authenticated entity according to the authentication response message.

Alternatively, the authenticated entity further comprising:

a third receiving module configured to receive an authentication response acknowledge message constructed by the authenticating entity; and a second authenticating module configured to judge the validity of the authenticating entity after receiving the authentication response acknowledge message.

The present invention has the following advantages:

The present invention provides, completely based on the exclusive or operation, a method and a system for entity authentication in a resource-limited network, and the exclusive or operation is far more efficient than the symmetrical or unsymmetrical encryption and decryption operation. Thus, the present invention effectively saves the calculation overhead during the entity authentication process, and improves the operation efficiency of the authentication process. The present invention implements a mutual authentication between entities based on a pre-shared key, negotiates and obtains the session key between both authentication parties, and ensures the secure communications between subsequent entities. Thus, the present invention is applicable to the resource-limited network, and has advantages such as low overhead, high computational efficiency, secure and reliable operation, etc.

DETAILED DESCRIPTION

The technical solutions of the embodiments of the present invention will be clearly and completely described as follows with reference to the drawings. Apparently, the described embodiments are just a part of embodiments of the present invention rather than all the embodiments. Based on the embodiments of the present invention, any other embodiment obtained by a person skilled in the art without paying any creative effort shall fall within the protection scope of the present invention.

Figure 1:
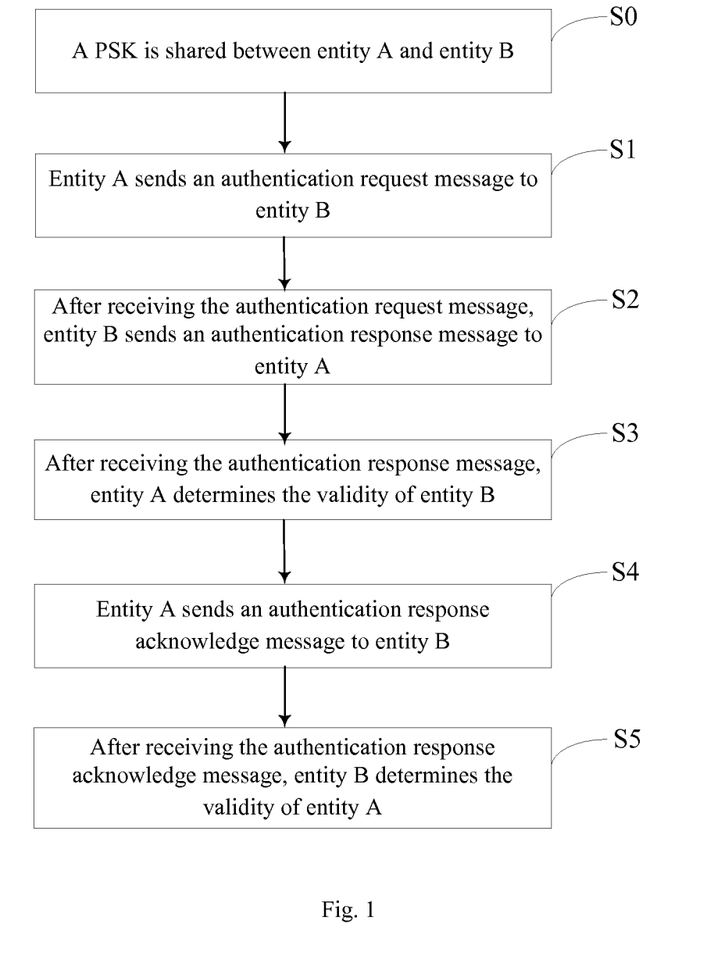
FIG. 1 is a flow diagram of a method for entity authentication provided by the present invention.

Referring to FIG. 1, the present invention provides a method for entity authentication, comprising the following steps:

Step S0: the entity A shares a Pre-Shared Key (PSK) with the entity B;

Step S1: the entity A sends an authentication request message 10 to the entity B.

Figure 3:
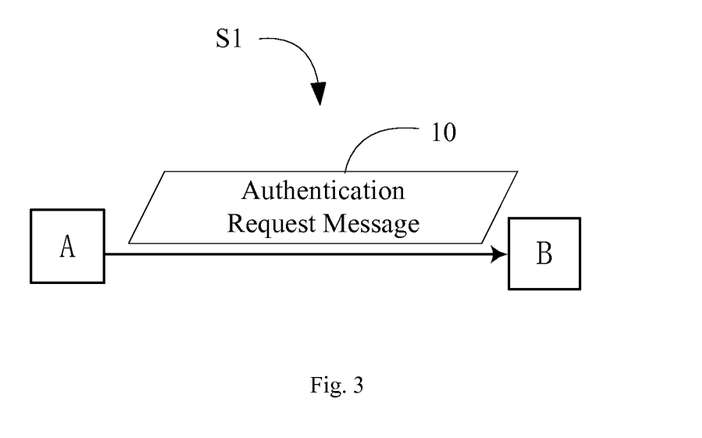
FIG. 3 is a flow diagram of step S1 in FIG. 1.

Please refer to FIG. 3 for the detailed flow of the steps. The authentication request message 10 may include SN1, which is obtained in such a manner that the entity A generates a random number N1 to calculate SN1=N1⊕PSK, wherein the symbol '⊕' represents a bitwise exclusive or operation (the same below).

Step S2: after receiving the authentication request message 10 sent by the entity A, the entity B sends an authentication response message to the entity A.

Figure 4:
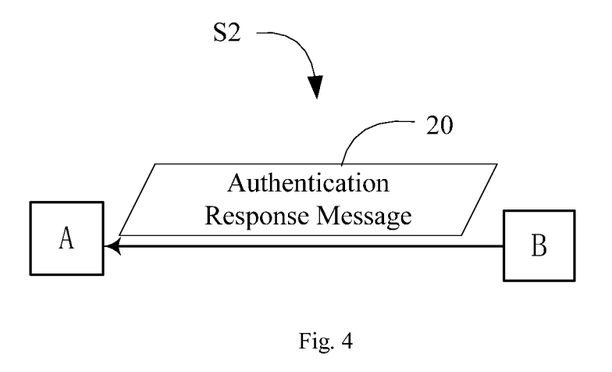
FIG. 4 is a flow diagram of step S2 in FIG. 1.

Please refer to FIG. 4 for the detailed flow of this step. Firstly, the entity B calculates N1=SN1⊕PSK, obtains RN1 by reversing the bit sequence of N1 tailfirst, and calculates SRN1=RN1⊕PSK. Next, the entity B generates a random number N2 to calculate SN2=N2⊕PSK. The entity B constructs an authentication response message 20 and sends it to the entity A, wherein the authentication response message 20 comprises the calculated SRN1 and SN2.

To be noted, it is a mutual authentication mode that the authentication response message 20 comprises SRN1 and SN2. The entity B does not need to generate N2 and calculate SN2 when the entity A performs unilateral authentication on the entity B, and in that case, the authentication response message 20 sent from the entity B to the entity A only contains SRN1.

Step S3: after receiving the authentication response message 20 sent by the entity B, the entity A determines the validity of the entity B.

Figure 5:
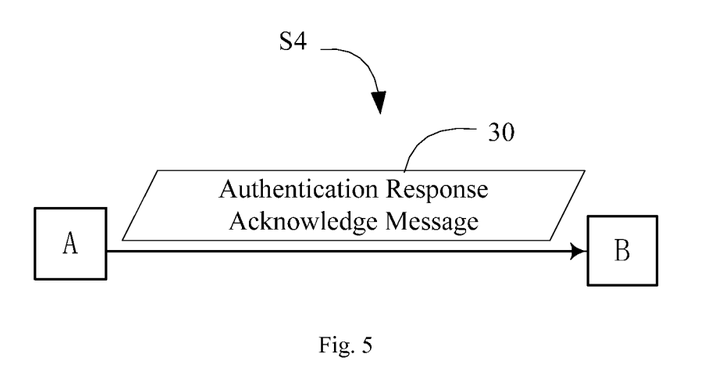
FIG. 5 is a flow diagram of step S4 in FIG. 1.

Please refer to FIG. 5 for the detailed flow of this step. Firstly, the entity A calculates RN1=SRN1⊕PSK, obtains N1' by reversing the bit sequence of RN1 tailfirst, and determines whether N1' is equal to N1 generated by the entity A in step S1; if N1' is not equal to N1, the entity A discards the authentication response message 20; and if N1' is equal to N1, the entity A determines that the entity B is valid, which means that the entity A performs a successful authentication on the entity B.

The present invention is completely based on the exclusive or operation far more efficient than the symmetrical or unsymmetrical encryption and decryption operation, thus the entity A can perform a low-overhead authentication on the entity B, which is suitable to the resource-limited network.

Further, in order to realize the mutual authentication between the entity A and the entity B with a low overhead, the following step S4 may be further performed.

Step S4: after performing a successful authentication on the entity B, the entity A sends an authentication response acknowledge message to the entity B.

The entity A calculates N2=SN2⊕PSK, obtains RN2 by reversing the bit sequence of N2 tailfirst, calculates SRN2=RN2⊕PSK, constructs an authentication response acknowledge message 30 and sends it to the entity B, wherein the authentication response acknowledge message 30 comprises SRN2. Meanwhile, the entity A calculates a session key SK=N1⊕N2⊕PSK between the entity A and the entity B, so as to protect the session message between them. The operation of calculating the session key is optional, and the entity A calculates the session key SK only when the session message between the entity A and the entity B need to be protected.

Step S5: after receiving the authentication response acknowledge message 30 sent by the entity A, the entity B determines the validity of the entity A.

Firstly, the entity B calculates RN2=SRN2⊕PSK, obtains N2' by reversing the bit sequence of RN2 tailfirst, and determines whether N2' is equal to N2 generated in step S2; if N2' is equal to N2, the entity B determines that the entity A is valid, and calculates a session key between the entity B and the entity A, SK=N1⊕N2⊕PSK; if N2' is not equal to N2, the entity B discards the authentication response acknowledge message 30. The operation of calculating the session key is optional after the entity B authenticates that the entity A is valid, and the entity B calculates the session key only when the session message between the entity B and the entity A need to be protected.

After the entity B completes the authentication of the validity of the entity A, the present invention implements a mutual authentication between entities based on a pre-shared key. Meanwhile, the entity A and the entity B can further negotiate and obtain the session key between both authentication parties, thereby ensuring the secure communications between subsequent entities.

In other embodiment, in steps S1 and S2, message timeout processing time limits T1 and T2 may be set for the entity A and the entity B, respectively. Wherein in step S1, if the entity A does not receive the correct authentication response message 20 within time T1 after sending the authentication request message 10, the entity A resends the authentication request message 10 to the entity B, and if the correct authentication response message 20 is not received when the authentication request message 10 is resent m times (a preset number of times of resending the authentication request message 10) and the time by which the authentication response message 20 is waited to be received is T1 each time, the entity A determines that the authentication fails. In step S2, if the entity B does not receive the correct authentication response acknowledge message 30 within time T2 after sending the authentication response message 20, the entity B resends the authentication response message 20 to the entity A, and if the correct authentication response acknowledge message 30 is not received when the authentication response message 20 is resent p times (a preset number of times of resending the authentication response message 20) and the time by which the authentication response acknowledge message 30 is waited to be received is T2 each time, the entity B determines that the authentication fails. By applying the above message timeout resending mechanism, the packet loss tolerability of the communication process in the present invention can be improved.

In other embodiment, in step S3, the entity A may send an authentication result message to the entity B after receiving the authentication response message 20. If the entity A determines that the entity B is valid, the authentication result message contains authentication success information, and when the entity A determines that the entity B is invalid, the authentication result message contains authentication failure information. In that case, the entity B may set a message timeout processing time limit T4 in step S2. If the entity B does not receive the correct authentication result message within time T4 after sending the authentication response message 20, the entity B resends the authentication response message 20 to the entity A, and if the correct authentication result message is not received when the authentication response message 20 is resent q times (a preset number of times of resending the authentication response message 20) and the time by which the authentication result message is waited to be received is T4 each time, the entity B determines that the authentication fails.

In other embodiment, in step S5, the entity B may send an authentication result message to the entity A after receiving the authentication response acknowledge message 30. If the entity B determines that the entity A is valid, the authentication result message contains authentication success information, and if the entity B determines that the entity A is invalid, the authentication result message contains authentication failure information. In that case, the entity A may set a message timeout processing time limit T3 in step S4. If the entity A does not receive the correct authentication result message within time T3 after sending the authentication response acknowledge message 30, the entity A resends the authentication response acknowledge message 30 to the entity B, and if the correct authentication result message is not received when the authentication response acknowledge message 30 is resent n times (a preset number of times of resending the authentication response acknowledge message 30) and the time by which the authentication result message is waited to be received is T3 each time, the entity A determines that the authentication fails.

Figure 2:
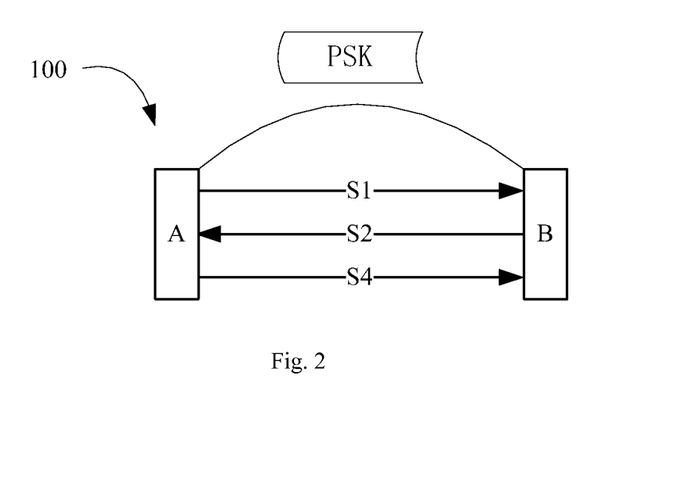
FIG. 2 is a structure diagram of a system for entity authentication provided by the present invention.

In addition to a method for entity authentication in a resource-limited network, the present invention further provides a system 100 for entity authentication. Referring to FIG. 2, the system 100 for entity authentication includes an entity A and an entity B. A PSK has been shared between the entity A and the entity B before the system 100 operates. Referring to FIGS. 1 to 5, the entity A sends an authentication request message to the entity B, and receives an authentication response message from the entity B, meanwhile sends an authentication response acknowledge message to the entity B. The entity B receives the authentication request message from the entity A and sends the authentication response message to the entity A, meanwhile receives the authentication response acknowledge message from the entity A.

The entity A in the present invention may be a reader or an electronic tag in the Radio Frequency Identification (RFID) system. When the entity A is a reader, the entity B is an electronic tag; and when the entity A is an electronic tag, the entity B is a reader. The entity A in the present invention may also be a coordinator or a normal node in the Magnetic Field Area Network (MFAN). When the entity A is a coordinator, the entity B is a normal node; and when the entity A is a normal node, the entity B is a coordinator. In addition to the fields of RFID and MFAN, the present invention may be further applied to the fields such as Sensor Network (SN) (e.g., the entity A is a cluster head node, and the entity B is a normal node), Wireless Personal Area Network (WPAN) (e.g., the entity A is a coordinator, and the entity B is a device) and the like.

In conclusion, the present invention implements an entity authentication with a low overhead based on the exclusive or operation, and it is applicable to extensive fields.

The objects, technical solutions and advantages of the present invention are further described in details through the above preferred embodiments. It shall be appreciated that those descriptions are just the preferred embodiments of the present invention, rather than limitations thereto. Any modification, equivalent replacement, improvement, etc. made within the spirit and rule of the present invention shall fall within the protection scope of the present invention. The range of benefits claimed by the present invention shall be determined by the range applied for by the present invention, rather than being limited to the above embodiments.

What is claimed is:

1. A method for entity authentication in a resource-limited network, characterized in comprising:

sharing a Pre-Shared key (PSK) between the entity A and the entity B, sending, by an entity A, an authentication request message to an entity B, wherein the authentication request message comprises SN1 obtained in such a manner that the entity A generates a random number N1 and calculates SN1=N1□PSK, wherein the symbol '□' represents a bitwise exclusive or operation;

sending, by the entity B, an authentication response message to the entity A after receiving the authentication request message sent by the entity A, wherein sending, by the entity B, the authentication response message to the entity A specifically comprising:

calculating, by the entity B, N1=SN1 □PSK, obtaining RN1 by reversing the bit sequence of N1 tailfirst, and calculating SRN1=RN1 □PSK;

constructing, by the entity B, the authentication response message and sending the authentication response message to the entity A, wherein the authentication response message (20) comprises SRN1; and determining, by the entity A, the validity of the entity B according to the received authentication response message;

wherein determining, by the entity A, the validity of the entity B according to the received authentication response message specifically comprising: after receiving, by the entity A, the authentication response message sent by the entity B, firstly, calculating, by the entity A, RN1=SRN1⊕PSK, obtaining N1' by reversing the bit sequence of RN1 tailfirst, and determining whether N1' is equal to the N1 generated by the entity A, wherein if N1' is not equal to N1, the entity A discards the authentication response message; if N1' is equal to N1, the entity A determines that the entity B is valid, which means that the entity A performs a successful authentication on the entity B;

wherein the entity A and B are devices.

2. The method for entity authentication in a resource-limited network according to claim 1, characterized in that after determining, by the entity A, the validity of the entity B according to the received authentication response message, the method further comprises:

sending, by the entity A, an authentication result message to the entity B, wherein if the entity A determines that the entity B is valid, the authentication result message contains authentication success information; if the entity A determines that the entity B is invalid, the authentication result message contains authentication failure information.

3. The method for entity authentication in a resource-limited network according to claim 2, characterized in further comprising: setting a message timeout processing time limit T4, then: if the entity B does not receive the correct authentication result message within time T4 after sending the authentication response message, the entity B resends the authentication response message to the entity A; and if the entity B does not receive the correct authentication result message when the authentication response message is resent q times and the time by which the authentication result message is waited to be received is T4 each time, the entity B determines that the authentication fails, wherein q is a preset number of times of resending the authentication response message.

4. The method for entity authentication in a resource-limited network according to claim 1, characterized in determining, by the entity A, the validity of the entity B according to the received authentication response message specifically comprising:
the entity A determines whether the entity B is valid according to the received authentication response message; if the entity A determines whether the entity B is valid, it means that the entity A performs a successful authentication on the entity B; and if the entity A determines whether the entity B is invalid, the entity A discards the authentication response message.

5. The method for entity authentication in a resource-limited network according to claim 4, characterized in that if the entity A performs a successful authentication on the entity B, the method further comprises:
constructing, by the entity A, an authentication response acknowledge message and sends the authentication response acknowledge message to the entity B.

6. The method for entity authentication in a resource-limited network according to claim 5, characterized in further comprising:
determining, by the entity B, the validity of the entity A after the entity B receives the authentication response acknowledge message.

7. The method for entity authentication in a resource-limited network according to claim 6, characterized in that after determining, by the entity B, the validity of the entity A after the entity B receives the authentication response acknowledge message, the method further comprises: sending, by the entity B, an authentication result message to the entity A, wherein if the entity B determines that the entity A is valid, the authentication result message contains authentication success information, if the entity B determines that the entity A is invalid, the authentication result message contains authentication failure information.

8. The method for entity authentication in a resource-limited network according to claim 7, characterized in further comprising: setting a message timeout processing time limit T3, then: if the entity A does not receive the correct authentication result message within time T3 after sending the authentication response acknowledge message, the entity A resends the authentication response acknowledge message to the entity B; further, if the entity A does not receives the correct authentication result message when the authentication response acknowledge message is resent n times and the time by which the authentication result message is waited to be received is T3 each time, the entity A determines that the authentication fails, wherein n is a preset number of times of resending the authentication response acknowledge message.

9. The method for entity authentication in a resource-limited network according to claim 1, wherein determining, by the entity A, the validity of the entity B according to the received authentication response message specifically comprising:
after receiving, by the entity A, the authentication response message sent by the entity B, firstly, calculating, by the entity A, RN1=SRN1□PSK, obtaining N1' by reversing the bit sequence of RN1 tailfirst, and determining whether N1' is equal to N1 generated by the entity A in step S1, wherein if N1' is not equal to N1, the entity A discards the authentication response message: if N1' is equal to N1, the entity A determines that the entity B is valid, which means that the entity A performs a successful authentication on the entity B.

10. The method for entity authentication in a resource-limited network according to claim 1, characterized in sending, by the entity B, the authentication response message to the entity A specifically comprising:
generating, by the entity B, a random number N2 to calculate SN2=N2 ⊕PSK, and constructing, by the entity B, the authentication response message and sending the authentication response message to the entity A, wherein the authentication response message comprises SRN1 and SN2,
wherein if the entity A performs a successful authentication on the entity B, the method further comprises: constructing, by the entity A, an authentication response acknowledge message and sends the authentication response acknowledge message to the entity B specifically comprising: calculating, by the entity A, N2=SN2 ⊕PSK, obtaining RN2 by reversing the bit sequence of N2 tailfirst, calculating SRN2=RN2 ⊕PSK, constructing the authentication response acknowledge message and sending the authentication response acknowledge message to the entity B, wherein the authentication response acknowledge message comprises SRN2,
wherein after receiving, by the entity B, the authentication response acknowledge message, the method further comprises: determining, by the entity B, the validity of the entity A specifically comprising: calculating, by the entity B, RN2=SRN2 ⊕PSK, obtaining N2' by reversing the bit sequence of RN2 tailfirst, and determining whether N2' is equal to N2 generated in step S2, and if N2' is equal to N2, determining, by the entity B, that the entity A is valid: if N2' is not equal to N2, the entity B discards the authentication response acknowledge message.

11. The method for entity authentication in a resource-limited network according to claim 10, characterized in constructing, by the entity A, the authentication response acknowledge message and sending the authentication response acknowledge message to the entity B further comprising:
calculating, by the entity A, a session key SK=N1 ⊕ N2 ⊕PSK between the entity A and the entity B.

12. The method for entity authentication in a resource-limited network according to claim 10, characterized in determining, by the entity B, the validity of the entity A further comprising:
calculating, by the entity B, a session key SK=N1 ⊕ N2 ⊕PSK between the entity B and the entity A when the entity B determines that the entity A is valid.

13. The method for entity authentication in a resource-limited network according to claim 1, characterized in further comprising: setting, by the entity A, a message timeout processing time limit T1 for the entity A, then: if the entity A does not receive the correct authentication response message within time T1 after sending the authentication request message, resending, by the entity A, the authentication request message to the entity B; further, if the correct authentication response message is not received when the authentication request message is resent m times and the time by which the authentication response message is waited to be received is T1 each time, the entity A determines that the authentication fails, wherein m is a preset number of times of resending the authentication request message.

14. The method for entity authentication in a resource-limited network according to claim 1, characterized in further comprising: setting, by the entity B, a message timeout processing time limit T2 for the entity B, then: if the entity B does not receive the correct authentication response acknowledge message within time T2 after sending the authentication response message, resending, by the entity B, the authentication response message to the entity A; further, if the correct authentication response acknowledge message is not received when the authentication response message is resent p times and the time by which the authentication response acknowledge message is waited to be received is T2 each time, the entity B determines that the authentication fails, wherein p is a preset number of times of resending the authentication response message.

15. An authenticating entity in a resource-limited network, characterized in that the authenticating entity has shared a PSK with an authenticated entity; wherein the authenticating entity comprises:

a first sending module, including a first transmitter, configured to send an authentication request message to the authenticated entity, wherein the authentication request message comprises SN1 obtained in such a manner that the authenticating entity generates a random number N1 and calculates SN1=N1 □PSK, wherein the symbol '□' represents a bitwise exclusive or operation;

a first receiving module, including a first receiver, configured to receive an authentication response message returned by the authenticated entity having received the authentication request message, wherein the authentication response message (20) comprises SRN1, and SRN1 is calculated in such a manner that calculating, by the authenticated entity, N1=SN1 □PSK, obtaining RN1 by reversing the bit sequence of N1 tail-first, and calculating SRN1=RN1 □PSK; and a first authenticating module, including a first processor, configured to determines the validity of the authenticated entity according to the received authentication response message, wherein determining the validity of the authenticated entity according to the received authentication response message specifically comprising: after receiving, by the authenticating entity, the authentication response message sent by the authenticated entity, firstly, calculating, by the authenticating entity, RN1=SRN1 □PSK, obtaining N1' by reversing the bit sequence of RN1 tailfirst, and determining whether N1' is equal to the N1 generated by the authenticating entity, wherein if N1' is not equal to N1, the authenticating entity discards the authentication response message; if N1' is equal to N1, the authenticating entity determines that the authenticated entity is valid, which means that the authenticating entity performs a successful authentication on the authenticated entity;

wherein the authenticating entity and authenticated entity are devices.

16. The authenticating entity according to claim 15, characterized in further comprising:

a second sending module, including a second transmitter, configured to send an authentication response acknowledge message to the authenticated entity, so that the authenticated entity determines the validity of the authenticating entity after receiving the authentication response acknowledge message.

* * * * *